(12) United States Patent
Paul, Jr.

(10) Patent No.: US 11,338,655 B2
(45) Date of Patent: May 24, 2022

(54) AUTOMOBILE VISOR ORGANIZER FOR STORING DOCUMENTS AND A MOBILE DEVICE

(71) Applicant: Cleveland Paul, Jr., Lake Charles, LA (US)

(72) Inventor: Cleveland Paul, Jr., Lake Charles, LA (US)

( * ) Notice: Subject to any disclaimer, the term of this patent is extended or adjusted under 35 U.S.C. 154(b) by 0 days.

(21) Appl. No.: 16/729,186

(22) Filed: Dec. 27, 2019

(65) Prior Publication Data

US 2020/0215882 A1 Jul. 9, 2020

Related U.S. Application Data

(60) Provisional application No. 62/788,786, filed on Jan. 5, 2019.

(51) Int. Cl.

| | | |
|---|---|---|
| *B60J 3/02* | (2006.01) | |
| *B60R 11/02* | (2006.01) | |
| *B60R 16/02* | (2006.01) | |
| *H02J 7/02* | (2016.01) | |
| *H02J 7/00* | (2006.01) | |
| *B60R 11/00* | (2006.01) | |

(52) U.S. Cl.
CPC ......... *B60J 3/0278* (2013.01); *B60R 11/0241* (2013.01); *B60R 16/02* (2013.01); *H02J 7/0045* (2013.01); *H02J 7/02* (2013.01); *B60R 2011/0035* (2013.01)

(58) Field of Classification Search
CPC .... B60J 3/0278; B60R 11/0241; B60R 16/02; B60R 2011/0035; H02J 7/02; H02J 7/0045

See application file for complete search history.

(56) References Cited

U.S. PATENT DOCUMENTS

| | | |
|---|---|---|
| 5,301,856 A | 4/1994 | Newmann |
| D402,624 S | 12/1998 | Patterson |
| D431,299 S | 9/2000 | Lammie |
| D432,490 S | 10/2000 | Golenz |
| D435,511 S | 12/2000 | Eskandry |
| D446,765 S | 8/2001 | Bergh et al. |
| D567,714 S | 4/2008 | Chalek et al. |
| D609,626 S | 2/2010 | Murphy |
| 10,043,419 B1 * | 8/2018 | Michaud ................ B60J 3/0204 |
| 10,183,628 B2 * | 1/2019 | Mea ........................ B60R 11/00 |
| 10,640,049 B1 * | 5/2020 | Daniels .................. B60R 11/00 |
| 2015/0341712 A1 * | 11/2015 | Wilcox ............ H04M 1/72409 381/332 |
| 2019/0135194 A1 * | 5/2019 | Ligi, Jr. ................ B60J 3/0204 |

* cited by examiner

*Primary Examiner* — D Glenn Dayoan
*Assistant Examiner* — Melissa Ann Bonifazi
(74) *Attorney, Agent, or Firm* — Patrick Mixon

(57) ABSTRACT

An automobile visor organizer is taught which includes an area for storing a mobile device, an identification card, and a document. The mobile device storage area includes means for removably affixing a mobile device thereto. The invention includes a hook for removably holding an identification card, and a document aperture for storing a document therein. The invention includes a document guide on its backside for supporting the inserted document. The invention also includes a wireless charging pad with the mobile device storage area.

11 Claims, 8 Drawing Sheets

AUTOMOBILE VISOR ORGANIZER FOR STORING DOCUMENTS AND A MOBILE DEVICE

RELATED APPLICATIONS

The present application claims priority to, and incorporates by reference, U.S. Provisional Application No. 62/788,786, filed on Jan. 5, 2019.

RELATED FIELD

The present invention relates to a system, article and method for organizing items on an attachment for an automobile sun visor. More particularly, this invention relates to a system and method for storing documents and a mobile phone on an automobile sun visor.

BACKGROUND OF THE INVENTION

On occasion, it would be important for an automobile driver to access identifying information as quickly as possible. For example, the driver would need to quickly access is driver's license, registration and insurance if an accident occurs or if stopped by law enforcement. Typically, when an accident occurs, both drivers will want to provide and exchange insurance information quickly after the incident. Similarly, if a driver is stopped by law enforcement and asked to present license, registration, and insurance documents, the diver will want to access his documents as soon as possible.

Further still, it may also be important for the driver to be able to locate his mobile device quickly in an emergency or when exiting the vehicle after a drive. It is not uncommon for a driver to set his phone in one location inside the cab of the car before or during his drive, and for him to not be able to locate the phone at the end of the drive because of the shifting of the car during the drive moves the phone from its original location. What is needed is a system that secures the mobile so that the driver may instantly locate it at any time.

The conventional method of storing documents and mobile devices is to secure the items in the above the vehicles sun visor. Unfortunately for the driver, when the items are place loosely above the sun visor, the driver cannot lower the sun visor to block out the sun. To do so would mean items would no longer be secure, causing the items to fall to the floor or fly out of the window.

In some cases, the driver may store their documents and mobile devices on conventional visor organizers that affix to the automobile sun visor. The conventional visor organizers are typically secured to the visor using an elastic band, or hook and loop fabric (e.g., Velcro). Such conventional visor organizers have distinct pockets that secure the items. Unfortunately, the pockets do not provide quick access to the documents or mobile devices because the pockets in which the documents are stored are often themselves locket against easy access. That is, conventional visor organizer pockets are themselves generally locked using a zipper, Velcro, or a button. In which case, the driver cannot quickly access the documents or mobile device without first unlocking the pocket.

Another way that drivers have chosen secure documents and a mobile phone is to place the items in a vehicle glove compartment or armrest. Unfortunately, placing the items in a glove compartment of armrest presents similar access problems as conventional visor organizers. That is, a vehicle glove compartment or armrest is traditionally a completely closed off box having a hinged compartment door that may be open, closed and locked.

Further still, it is well documented that reaching for documents in your vehicle in the presence of a police officer may be unsafe because your hands are not visible to the officer during the encounter. Furthermore, if the driver needs quick access to his mobile device after an accident, he will have to unlock or open the locked box before he can access the mobile device and summon emergency help. What is needed is a simple and convenient means for storing important documents and a mobile device that provides the driver with instant access to the items.

Consequently, conventional systems for securing documents and mobile devices in an automobile are deficient in that the driver must either unlock or unzip the system to gain access to the items. What is needed is a system or device which allows the driver to quickly access his mobile device and documents.

BRIEF DESCRIPTION OF THE INVENTION

The present invention includes an automobile visor organizer for storing documents and a mobile device that allows the driver to instantly access them. The present invention is formed so that it may be removably affixed to an elongated side of a sun visor. In accordance with the invention, documents (e.g., car registration and insurance), driver identification (e.g., driver's license), and at mobile device (e.g., a mobile phone) may be stored on the visor such that it may be quickly accessed by a driver.

In one aspect, the invention includes a section for securing a mobile device. The area for securing the mobile device may use means for temporarily storing the mobile device. In accordance with the invention, the driver may quickly access the mobile device without unlocking or unstrapping it.

In another aspect, the invention includes a section for storing an identity card. In accordance with the invention, the section for storing the identity card is not locked. That is, the section for storing the identity card permits the driver to quickly retrieve the identification without having to first unlock or unzip the storage area.

In still another aspect, the invention includes an area for storing documents. The present invention allows the driver quick access to the documents. That is, the present invention secures the documents without locking them in a closed or locked compartment or pocket. The driver does not have to unlock the storage area before the document is retrieved.

In yet another aspect, the invention includes brackets for quick installation. That is, the driver may quickly install the invention on an automobile visor. That is, the present invention does not use straps or elastic bands for securing to a visor.

BRIEF DESCRIPTION OF THE DRAWINGS

A more complete understanding of the present invention may be derived by referring to the various embodiments of the invention described in the detailed descriptions and drawings and figures in which like numerals denote like elements, and in which.

DETAILED DESCRIPTION OF THE INVENTION

Figure 1:
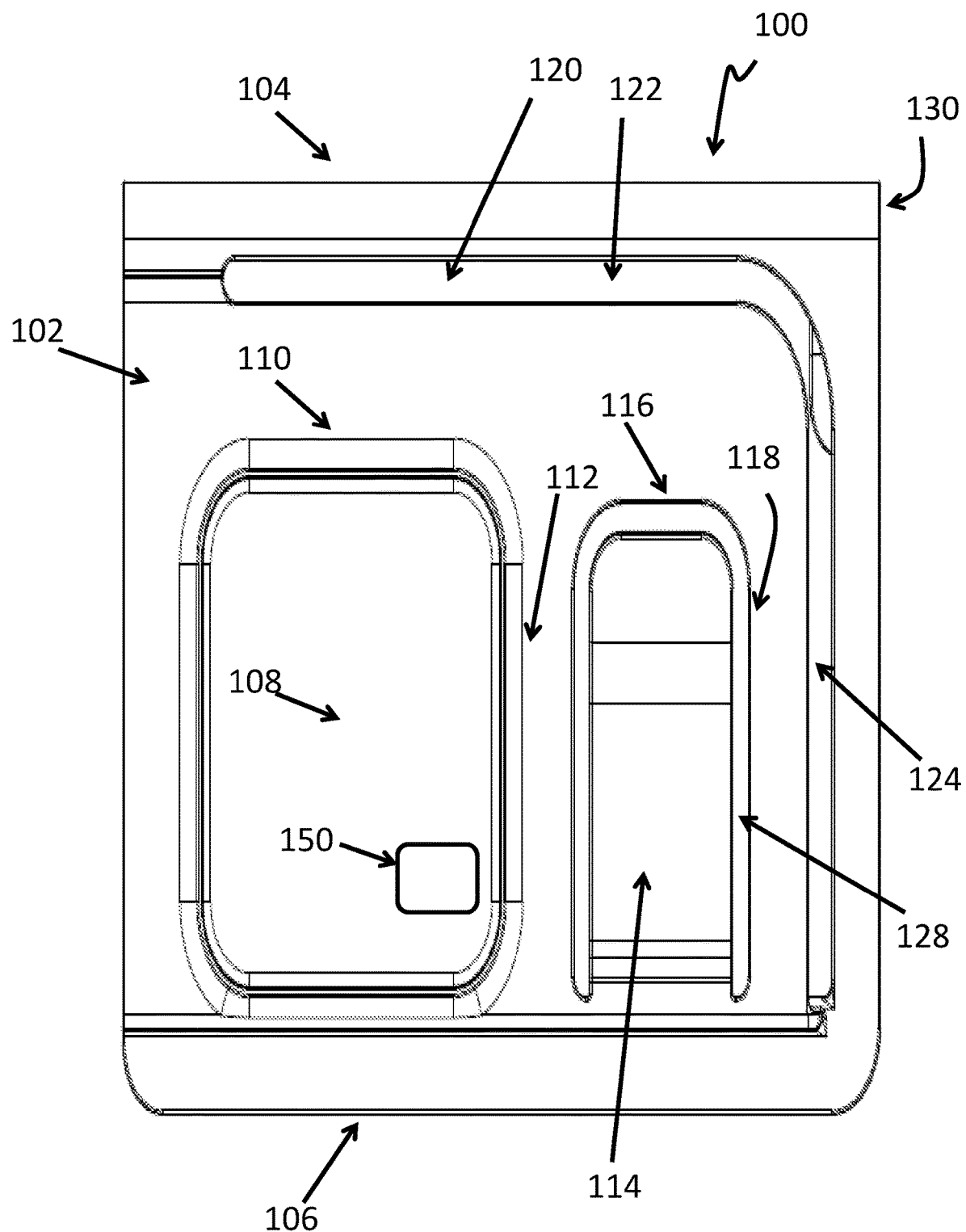
FIG. 1 is an exemplary illustration of the front facing view of a vehicle visor organizer according to exemplary embodiments of the present invention.

The present invention improves upon existing visor organizers in several ways, including that the present invention allows quicker access to documents and mobile phones secured thereon. FIG. 1 is an illustration of the front view of an exemplary vehicle visor organizer 100 according to exemplary embodiments of the present invention. In one exemplary embodiment, visor organizer 100 may be comprised of plastic or metal. As shown, visor organizer 100 may include an elongated rectangular body having a perimeter edge with a length and width. Visor organizer 100 may include a first elongated edge 104. Visor organizer 100 may further include a second elongated edge 106. In an exemplary embodiment, first elongated edge 104 is positioned on an opposite edge than second edge 106.

Visor organizer 100 may further include a front planar surface 102. Front planar surface 102 may have a mobile device storage area 108 in a first section. Mobile device storage area 108 may further include a mobile device storage area first edge 110 and mobile device storage area second edge 112. In an exemplary embodiment, mobile device storage area first edge 110 may be perpendicular to mobile device storage area second edge 112.

Visor organizer 100 may also include a second section including a hook 114. Hook 114 may be formed on front planar surface 102. The throat of the hook 114 may be formed from front planar surface 102. For example, the shank of the hook 114 may be formed of the planar surface 102. In another exemplary embodiment, than shank of hook 114 may be absent. That is, shank of hook 114 not exist or may be a hook area aperture 128.

Hook 114 may be upturned. That is, hook 114 may be turned such that the throat of hook 114 is directed toward first elongated edge 104. In an exemplary embodiment, hook 114 may include a hook first edge 116 and a hook second edge 118. In one exemplary embodiment hook first edge 116 may be parallel with first elongated edge 104. In another exemplary embodiment, hook first edge 116 may be perpendicular to hook second edge 118.

In some exemplary embodiments, hook 114 may be formed of the same material as visor organizer 100. Hook 114 may be formed such that the throat of hook 114 is contiguous with front planar surface 102. In another Hook 114 may be affixed to front planar surface 102 using any conventional affixing means, such as, weld, glue, screws, rivets, or the like. Hook 114 may be the length and width of a conventional identification card, such as, a driver's license. Further still, the curvature of hook 114 may be such that it may hold an identification card removably affixed therein. That is, the curvature of hook 114 may be such that hook 114 may removably hold an identification card between the hook 114 and front planar surface 102. In one particular embodiment, the gap of hook 114 may be 1 mm or less.

Visor organizer 100 may include a document aperture 120. Document aperture 120 may include a document aperture first section 122 adjacent to first elongated edge 104. Document aperture 120 may further include a second section 124 adjacent to hook second edge 118. In another exemplary embodiment document aperture first section 122 may be conjoined with document aperture second section 124. In still another embodiment, document aperture first section 122 may be perpendicular to document aperture section 124.

Figure 2:
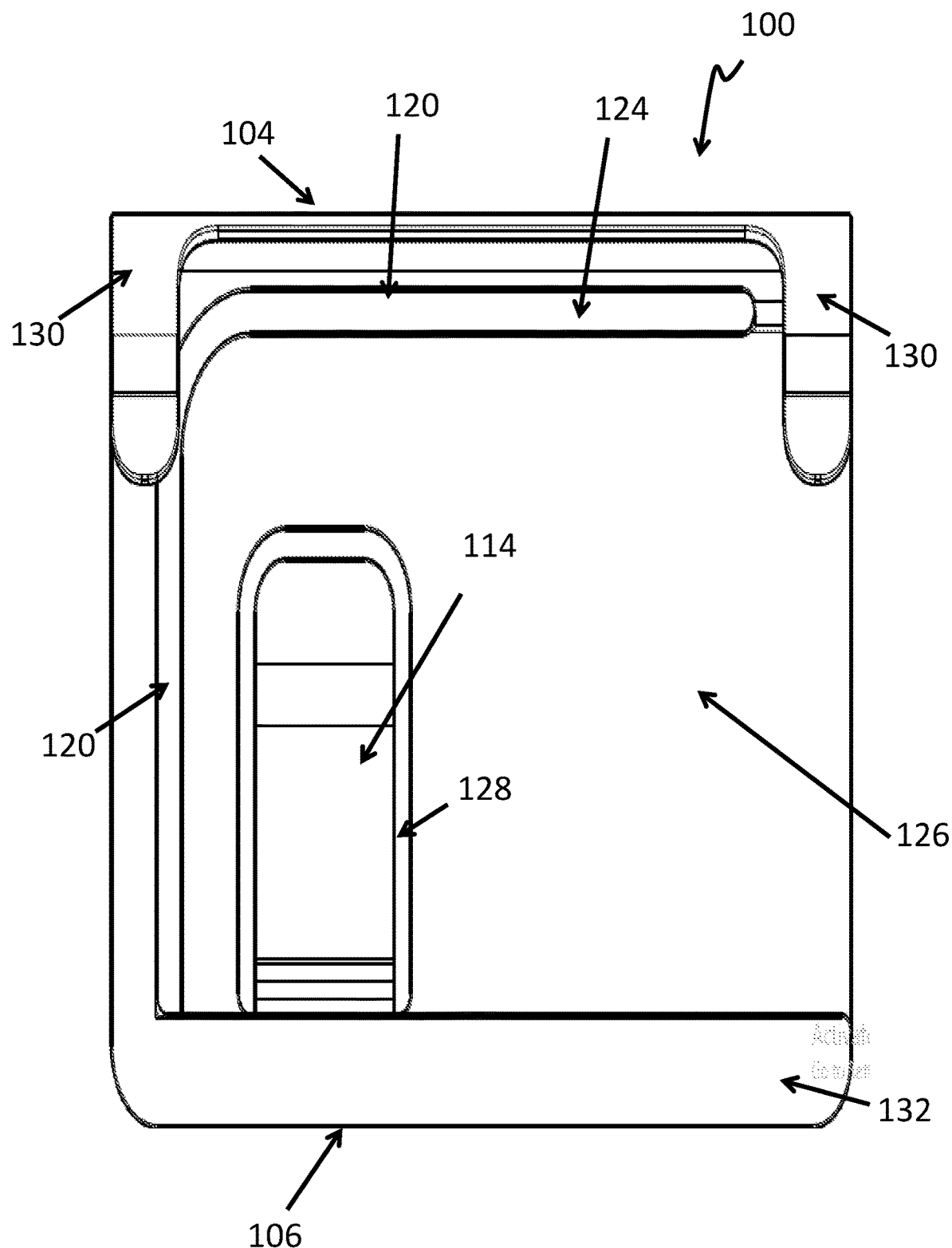
FIG. 2 is an exemplary illustration of the rear facing view of a vehicle visor organizer according to exemplary embodiments of the present invention.

FIG. 2 is an exemplary illustration of a visor organizer 100 in accordance with the present invention. As shown, visor organizer 100 may include a back planar surface 126. Visor organizer 100 may include a document guide 132. Document guide 132 may be affixed along second elongated edge 106. Document guide 132 may extend along the length of second elongated edge 106. Document guide 136 may configured to receive a document thereon. For example, document guide 132 may provide sufficient space between document guide 136 and back planar surface 126 such that a document may be easily slid therein. In another embodiment, a document inserted into document aperture 120 may be supported by document guide 132. A document may be inserted into document aperture section 124. A document that has been inserted in to document aperture section 124 may be further inserted into document guide 136.

As can be seen in FIGS. 1 and 2, document aperture 120 provides access from front planar surface 102 to back planar surface 126. Similarly, hook area aperture 128 may provide access from front planar surface 102 to back planar surface 126. Hook area aperture 128 may be of sufficient length and width, such that, hook 114 may be visible by viewing visor organizer 100 from the rear.

Visor organizer 100 may further include a visor bracket 130 for attaching visor organizer 100 to an automobile visor (not shown). Visor bracket 130 may be adjacent to first elongated edge 104. In one exemplary embodiment, visor bracket 130 may be contiguous with first elongated edge 104. Visor bracket 130 may be formed of the same material as back planar surface 126.

Figure 3:
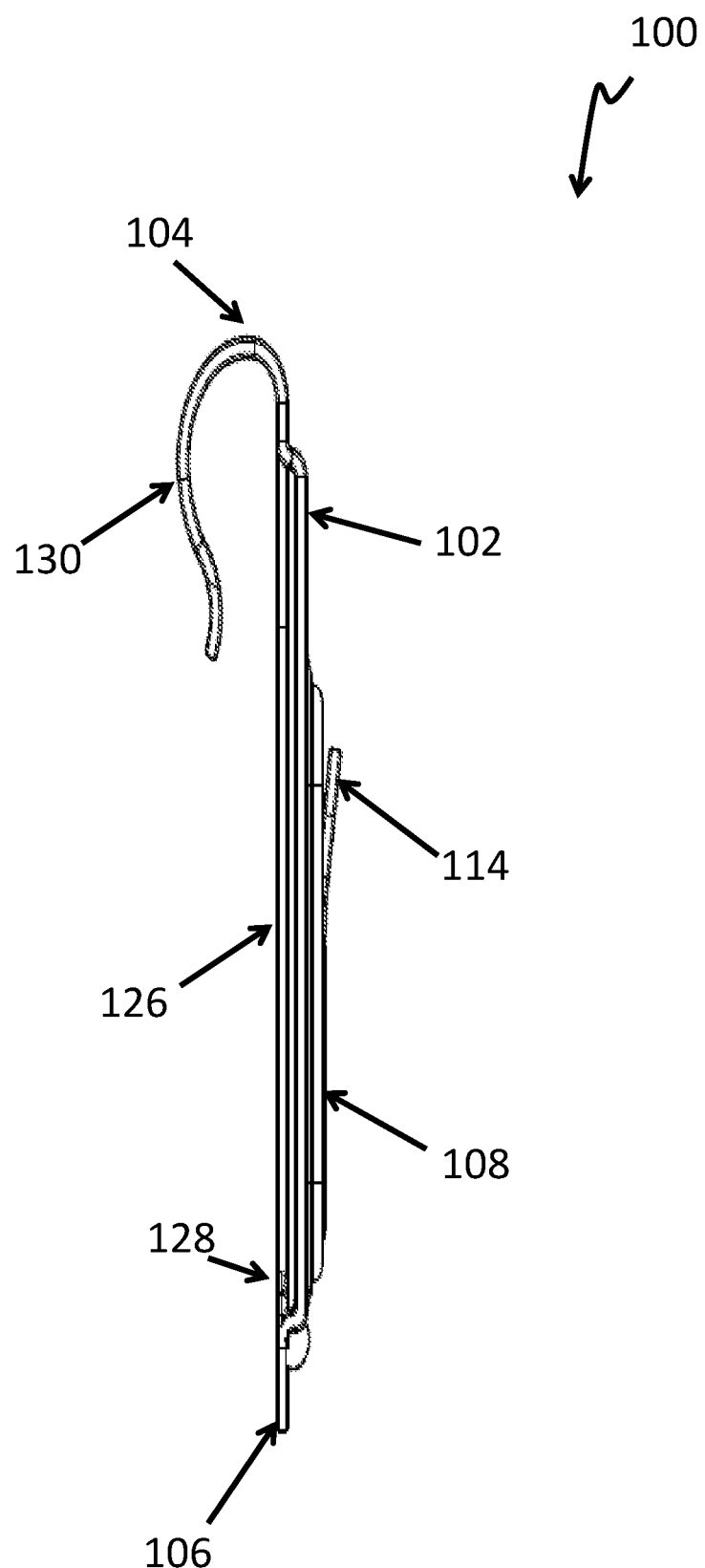
FIG. 3 is an exemplary illustration of a right-side view of a vehicle visor organizer according to exemplary embodiments of the present invention.
Figure 4:
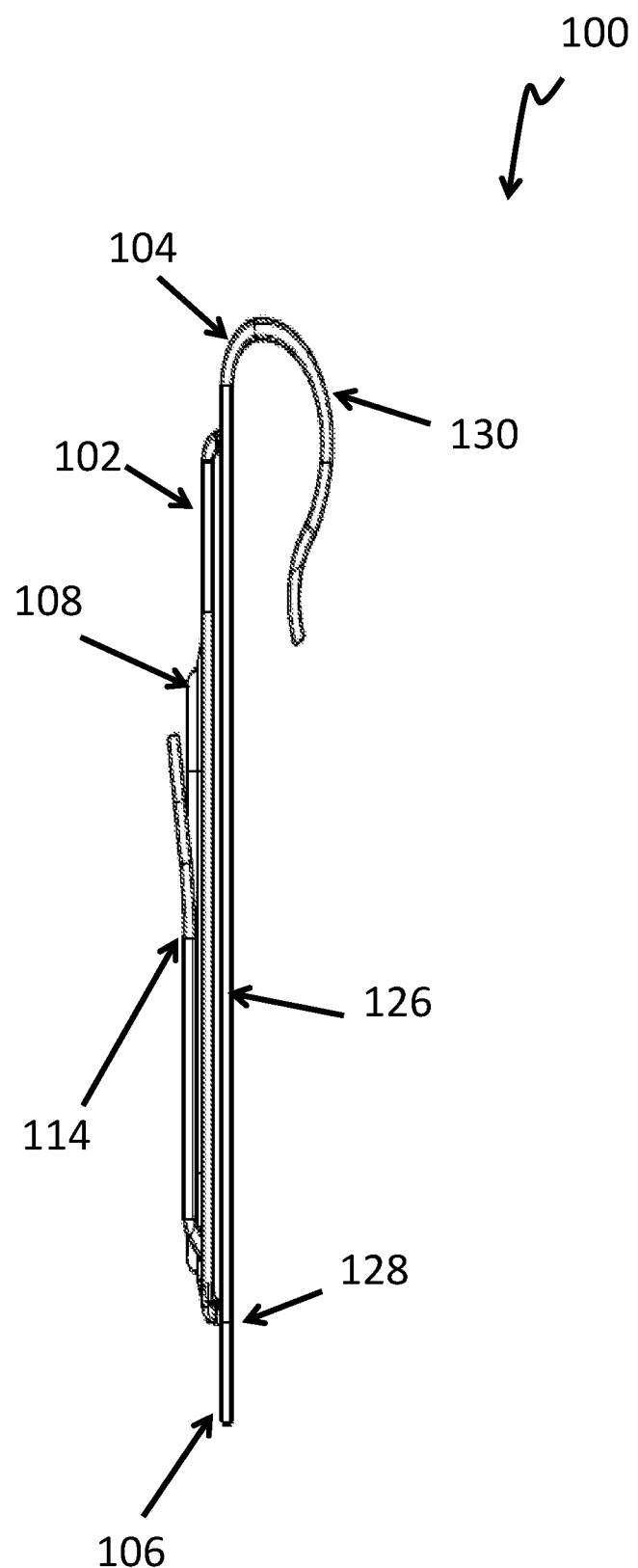
FIG. 4 is an exemplary illustration of a left-side view of a vehicle visor organizer according to exemplary embodiments of the present invention.

Visor bracket 130 may be curved such that visor bracket 130 may permit visor organizer 100 to hand from an automobile visor. FIGS. 3 and 4 depict exemplary illustrations of visor organizer 100 of the right-side view and left-side view respectively of visor organizer 100. As shown, visor bracket 130 may be curved toward second elongated edge 106. More particularly, visor bracket 130 may be a hooked such that the throat of the visor bracket 130 includes a gap between the shank and throat which permits an automobile visor to be inserted therein. Once the visor is inserted therein, visor organizer 100 may be removably affixed to the automobile visor.

Figure 5:
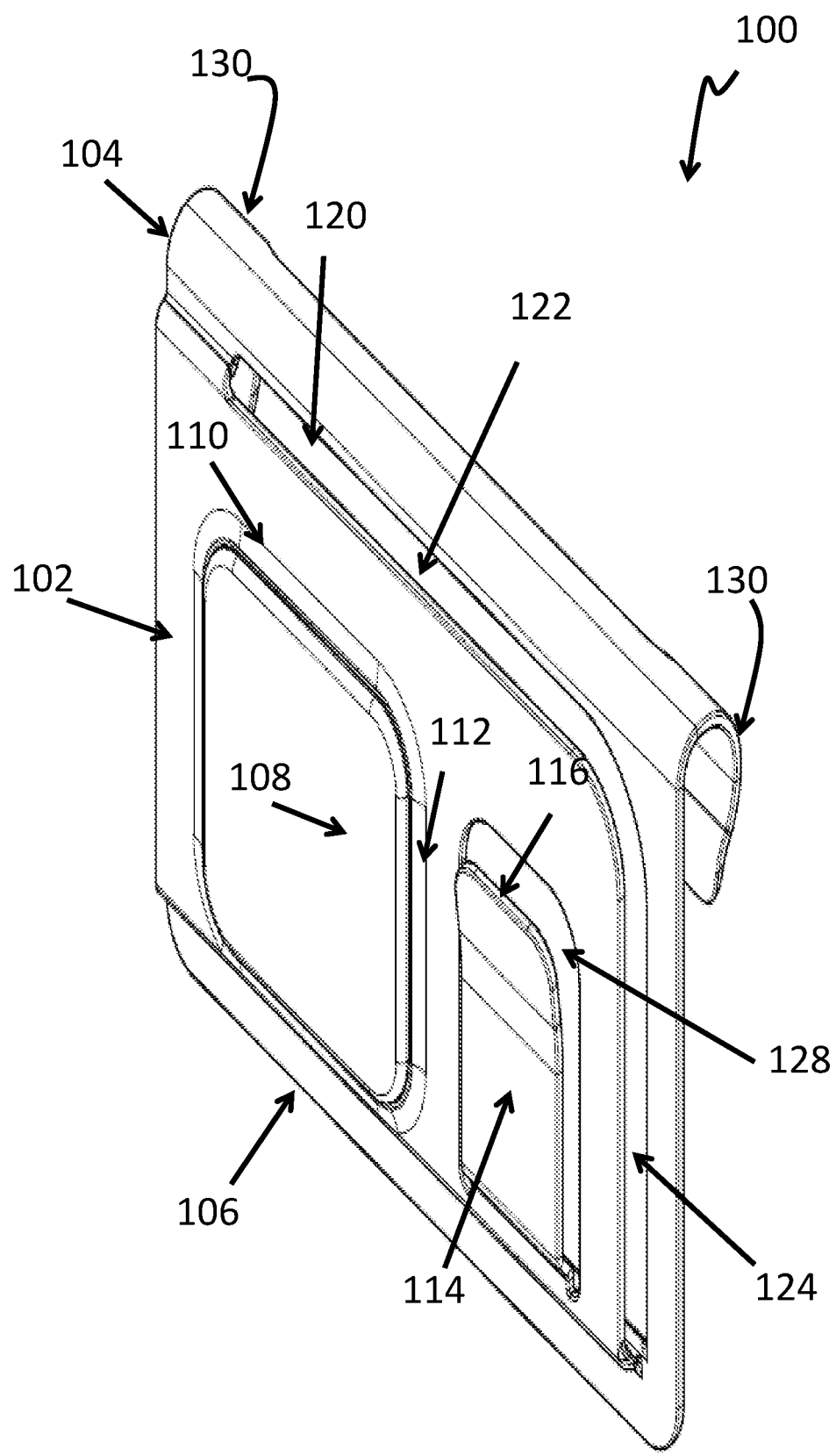
FIG. 5 is an exemplary illustration of an isometric view of a vehicle visor organizer according to exemplary embodiments of the present invention.

FIG. 5 depicts an isometric view of visor organizer 100. As can be seen, hook area aperture 128, and document aperture 120 provide access from front planar surface 102 to back planar surface 126. Further still, visor bracket 130 may be curved toward second elongated edge 106. Visor bracket 13 may be formed such that visor bracket 130 may be adjacent to document aperture 120.

Figure 6:
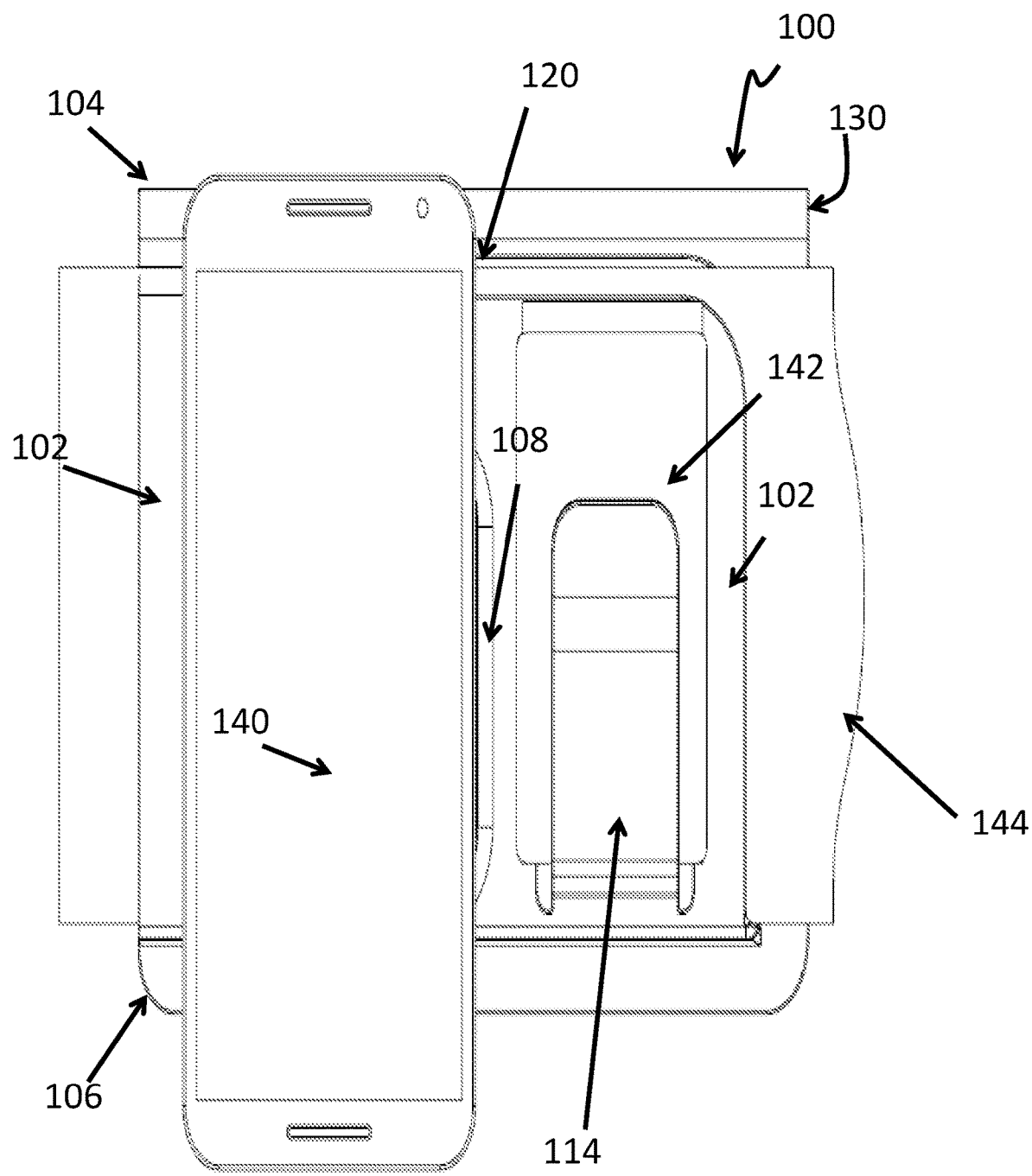
FIG. 6 is an exemplary illustration of a front facing view a vehicle visor organizer according to exemplary the present invention in use.
Figure 7:
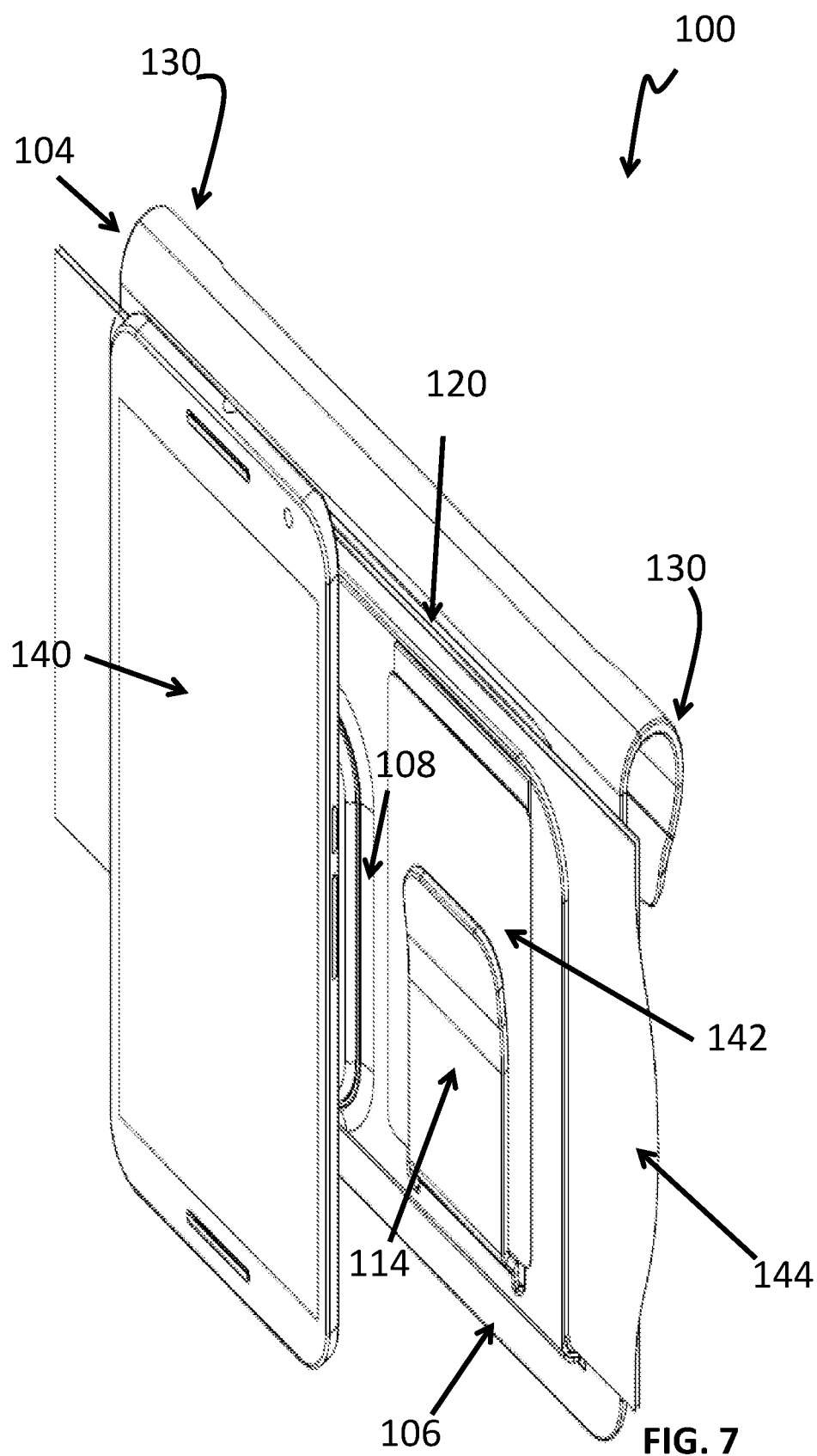
FIG. 7 is an exemplary illustration of an isometric view a vehicle visor organizer according to exemplary the present invention in use.
Figure 8:
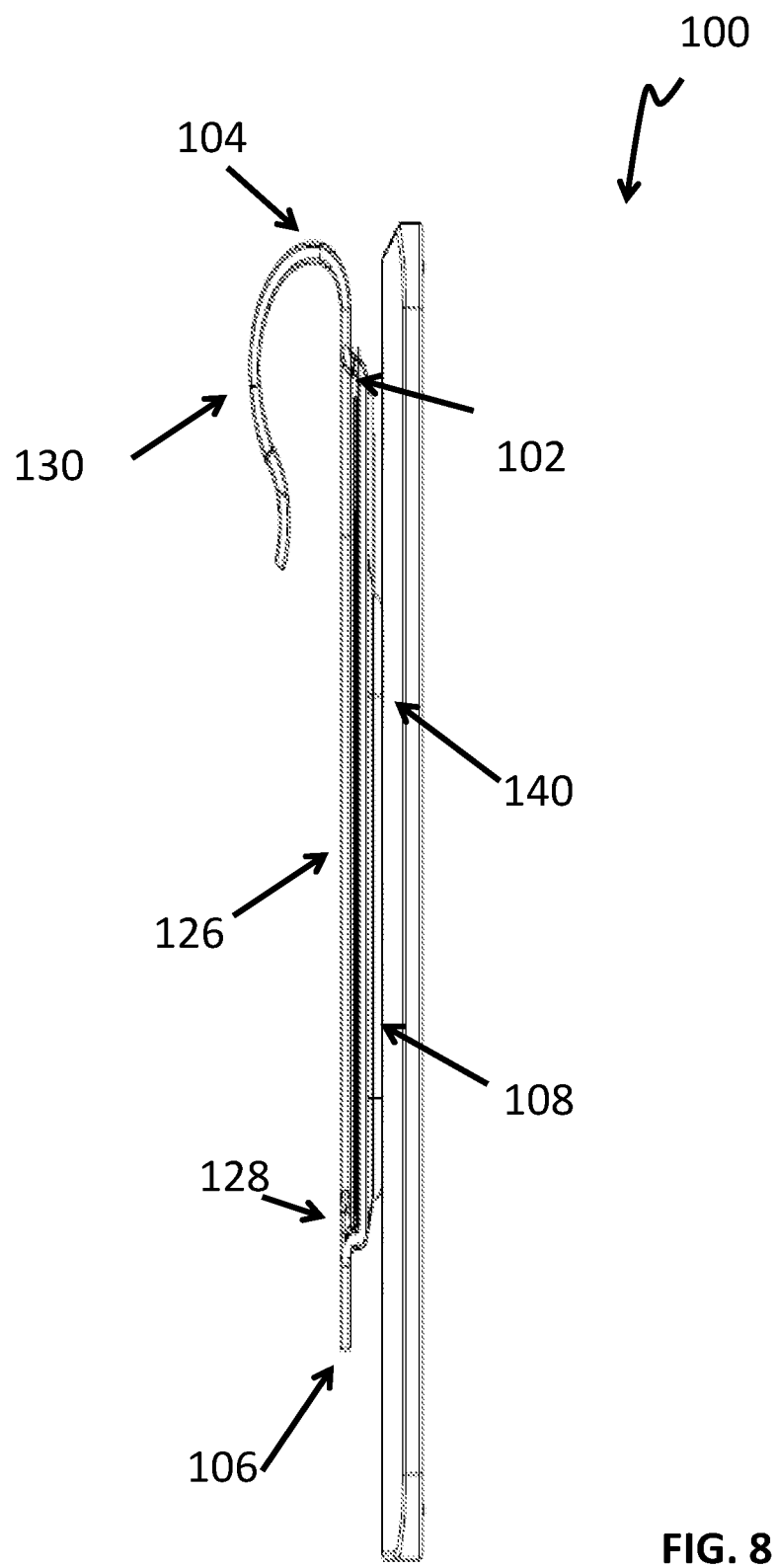
FIG. 8 is an exemplary illustration of a right-side view of a vehicle visor organizer according to exemplary embodiments of the present invention in use.

FIGS. 6-8 depict visor organizer 100 in use. That is, FIG. 6 depicts an exemplary illustration of a front facing view of visor organizer 100 in use. FIG. 7 depicts visor organizer 100 in isometric view. FIG. 8 depicts a right-side view of visor organizer 100 in use. As shown, visor organizer 100 may be used to store or hold a mobile device 140, an identification card 142, and a document 144.

Mobile device 140 may be any conventional mobile device, such as, a mobile phone, tablet, pager or the like. An exemplary document that may be inserted in document guide 136, and stored in this invention, may be a conventional, A4 legal or letter sized document, 50 pages or less, that has been folded in half or in thirds. Preferably, the document may comprise a conventional automobile registration or insurance document.

Mobile device 140 may be removably affixed to mobile storage area 108. Mobile device storage area 108 may include means for securing a mobile device thereon. For example, mobile device storage area 108 may include an adhesive for adhering a mobile device thereto. In another exemplary embodiment, mobile device storage area 108 may include a magnet. In such a case, the mobile device may include a magnet for mating with the magnet which may appear on mobile device storage area 108.

In yet another exemplary embodiment of the invention, mobile device storage area 108 may secure a mobile device using a hook and loop system (i.e., Velcro). For example, in one exemplary embodiment, mobile device storage area 108 may include a loop cloth, and the mobile device may include a hook cloth for mating with the loop cloth on mobile device storage area 108. During operation, the mobile device including the loop cloth may be pressed against the mobile device storage 108, such that the loops and hooks of the clothes intertwine.

In still another embodiment of the invention, mobile device storage area 108 may include a peg board lock system. For example, the mobile device may include the locking pegs, and mobile device storage area 108 may include holes therein for inserting and locking the pegs.

Even further, mobile device storage area 108 may include means for charging mobile device storage area 108. For example, mobile device storage area 108 may include a conventional charging pad, such as, the charging pads described in U.S. Pat. No. 10,461,583 issued to Yeo et al., U.S. Pat. No. 10,511,196 issued to Hosseinii, U.S. Pat. No. 10,491,029 issued to Hosseini, and U.S. Pat. No. 10,461,583 issued to Yeo et al. In such instance, mobile device 140 that may be placed on mobile device storage area 108 to be charged. Mobile device storage area 108 may include a charging pad, such as, for example, the charging pad included in QI Vent Mount by Scosche®. That is, the charging pad included may further include a conventional wireless charging pad and related connectivity. Such charging pad may use the 12-volt car charger as it power source, as is well known.

Another typical charging means for charging a mobile device placed mobile device storage area 108 may be used in the present invention is any conventional mobile phone device charging means that use the mobile device's charging port 150 (e.g., USB port, or micro-USB port) to charge. Exemplary conventional USB charging means may include a conventional charging port, and auxiliary chord as are compatable with the 12-volt car charger. In such case the mobile phone may be plugged into the charging port 150 to be charged using an auxiliary charging cord as it known in the art.

Hook 114 may be used to removably store identification card 142. During use, the driver may slide identification card 142 in between hook 114 and front planar surface 102. In this way, identification card 142 may be securely pinched in between hook 114 and front planar surface 102.

Document 142 is shown inserted in document aperture 120. As shown, document 142 may be inserted such that the majority of document 142 is inserted behind a portion of front planar surface 102. In such way, visor organizer 100 may removably secure document 144 thereon.

One skilled in the art will understand the operation of conventional adhesives. As such, adhesives will not be discussed herein for brevity. Furthermore, while the disclosure has been shown and described with reference to certain exemplary embodiments thereof, it will be understood by those skilled in the art that various changes in form and details may be made therein without departing from the spirit and scope of the disclosure as defined by the appended claims and their equivalents.

I claim:

1. A portable visor organizer comprising:
an elongated rectangular body having a perimeter edge with a length and a width, wherein the elongated rectangular body has a first elongated edge and a second elongated edge, the elongated rectangular body including:
(a) a front surface, the front surface including,
(i) a first section having a planar area, the first section planar area having a first edge and a second edge;
(ii) a second section adjacent to the first section planar area second edge, the second section including a hook, wherein the hook includes a first edge and a second edge; and
(iii) a document aperture having a first section and a second section, wherein the first aperture section is conjoined with second aperture section, wherein the first aperture section is adjacent to the planar area first edge, wherein the first aperture section is adjacent to the hook first edge, wherein the second aperture section is adjacent to the hook second edge;
(b) a back surface, wherein the document aperture provides access from the front surface to the back surface, the back surface including,
(i) a bracket, wherein the bracket is adjacent to the aperture first section, wherein the bracket is adjacent to the elongated rectangular body first elongated edge,
(ii) a document guide adjacent to the elongated rectangular body second elongated edge.

2. A portable visor organizer of claim 1, wherein the first section planar area includes a charging pad for wirelessly charging a mobile device.

3. A portable visor organizer of claim 1, wherein the first section planar area includes an adhesive for affixing a mobile device thereto.

4. A portable visor organizer of claim 1, further including a hook and loop material for affixing a mobile device thereto.

5. A portable visor organizer of claim 1 wherein the hook is upturned toward the planar area first edge.

6. A portable visor organizer of claim 5, wherein the hook is contiguous with the front surface.

7. A portable visor organizer of claim 6, wherein the gap between the hook throat and front surface is less than 1 mm.

8. A portable visor organizer of claim 1, wherein the document guide is contiguous with the back surface.

9. A portable visor organizer of claim 1, wherein the document guide is along length of the second elongated edge.

10. A portable visor organizer of claim 9, wherein the bracket is curved down toward the second elongated edge.

11. A portable visor organizer of claim 1, wherein the first section planar area includes a charging port for wired charging a mobile device.

* * * * *